United States Patent
Grauer, Jr. et al.

(10) Patent No.: US 9,507,429 B1
(45) Date of Patent: Nov. 29, 2016

(54) OBSCURE CAMERAS AS INPUT

(71) Applicant: Amazon Technologies, Inc., Reno, NV (US)

(72) Inventors: Arthur John Grauer, Jr., Seattle, WA (US); Craig Reeves Brookes, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 14/038,581

(22) Filed: Sep. 26, 2013

(51) Int. Cl.
*G06F 3/042* (2006.01)
*G06F 3/01* (2006.01)
*G06F 3/03* (2006.01)

(52) U.S. Cl.
CPC ............. *G06F 3/017* (2013.01); *G06F 3/0304* (2013.01); *G06F 3/0425* (2013.01)

(58) Field of Classification Search
CPC ..... G06F 3/017; G06F 3/0304; G06F 3/0425
See application file for complete search history.

(56) References Cited

U.S. PATENT DOCUMENTS

| | | | | |
|---|---|---|---|---|
| 8,686,943 B1* | 4/2014 | Rafii | ....................... | G06F 3/017 345/158 |
| 8,723,789 B1* | 5/2014 | Rafii | ....................... | G06F 3/011 345/156 |
| 8,773,512 B1* | 7/2014 | Rafii | ....................... | G06F 3/017 348/47 |
| 8,854,433 B1* | 10/2014 | Rafii | ....................... | G06F 3/017 348/42 |
| 8,943,582 B1* | 1/2015 | Zhou | ..................... | G06F 3/0488 726/19 |
| 2006/0036944 A1* | 2/2006 | Wilson | ................ | G06F 3/04883 715/702 |
| 2008/0168404 A1* | 7/2008 | Ording | .................. | G06F 3/0485 715/863 |
| 2008/0211778 A1* | 9/2008 | Ording | .................. | G06F 1/1626 345/173 |
| 2008/0229255 A1* | 9/2008 | Linjama | .................. | G06F 3/016 715/863 |
| 2008/0300055 A1* | 12/2008 | Lutnick | ............... | G07F 17/3209 463/39 |
| 2009/0079813 A1* | 3/2009 | Hildreth | ................. | H04N 7/147 348/14.03 |
| 2010/0060475 A1* | 3/2010 | Choi | ..................... | G06F 1/1616 340/689 |
| 2010/0066676 A1* | 3/2010 | Kramer | ................... | G06F 3/017 345/158 |
| 2010/0164891 A1* | 7/2010 | Hill | ....................... | G06F 3/0421 345/173 |

(Continued)

*Primary Examiner* — Michael J Eurice
(74) *Attorney, Agent, or Firm* — Seyfarth Shaw LLP; Ilan N. Barzilay (57) ABSTRACT

Various embodiments enable a user to provide an input to an application by covering or otherwise obscuring one or more cameras of a computing device in a predetermined sequence. For example, as content is displayed by a computing device, image information is captured with multiple cameras. Upon detecting a portion of a hand of a user, such as a finger, passing over two or more of the cameras, a sequence in which the hand passes over the cameras is compared to sequences stored by the computing device. In this example, each sequence stored by the computing device corresponds to an input to an application to launch the application, cause a function to be executed using the application, and the like. Accordingly, in response to the sequence matching one of the stored sequences, an input is provided to an application corresponding to the sequence.

20 Claims, 8 Drawing Sheets

(56) References Cited

U.S. PATENT DOCUMENTS

| | | | | |
|---|---|---|---|---|
| 2011/0050640 A1* | 3/2011 | Lundback | G06F 3/041 | |
| | | | 345/175 | |
| 2011/0154266 A1* | 6/2011 | Friend | A63F 13/06 | |
| | | | 715/863 | |
| 2011/0252346 A1* | 10/2011 | Chaudhri | G06F 3/04817 | |
| | | | 715/765 | |
| 2011/0254792 A1* | 10/2011 | Waters | G06F 1/1626 | |
| | | | 345/173 | |
| 2011/0291988 A1* | 12/2011 | Bamji | G06F 3/0428 | |
| | | | 345/175 | |
| 2012/0062558 A1* | 3/2012 | Lee | G06F 3/017 | |
| | | | 345/419 | |
| 2012/0229377 A1* | 9/2012 | Kim | G06F 3/017 | |
| | | | 345/157 | |
| 2012/0242793 A1* | 9/2012 | Im | G06F 3/011 | |
| | | | 348/46 | |
| 2012/0295661 A1* | 11/2012 | Kim | G06F 3/017 | |
| | | | 455/556.1 | |
| 2013/0053007 A1* | 2/2013 | Cosman | G06F 3/017 | |
| | | | 455/414.3 | |
| 2013/0147790 A1* | 6/2013 | Hildreth | G06T 19/006 | |
| | | | 345/419 | |
| 2013/0159939 A1* | 6/2013 | Krishnamurthi | G06F 3/011 | |
| | | | 715/863 | |
| 2013/0191911 A1* | 7/2013 | Dellinger | G06F 21/36 | |
| | | | 726/19 | |
| 2013/0201113 A1* | 8/2013 | Hinckley | G06F 3/0487 | |
| | | | 345/173 | |
| 2013/0249937 A1* | 9/2013 | Amacker | G06F 3/0304 | |
| | | | 345/619 | |
| 2013/0278499 A1* | 10/2013 | Anderson | G06F 3/01 | |
| | | | 345/156 | |
| 2014/0092014 A1* | 4/2014 | Srinivasan | G06F 3/013 | |
| | | | 345/158 | |
| 2014/0304665 A1* | 10/2014 | Holz | G06F 3/017 | |
| | | | 715/863 | |
| 2014/0320434 A1* | 10/2014 | Pantel | G06F 3/017 | |
| | | | 345/173 | |
| 2014/0362274 A1* | 12/2014 | Christie | G06F 3/0488 | |
| | | | 348/333.11 | |

* cited by examiner

OBSCURE CAMERAS AS INPUT

BACKGROUND

As people are increasingly using portable computing devices in a wider variety of ways, it can be advantageous to adapt the ways in which people interact with these devices. Shortcuts have been offered on various devices and various types of shortcuts have been implemented for a variety of purposes. One such approach has involved assigning a number on a keypad to a particular contact in a user's address book, so when the user presses and holds the particular number, a call is placed to the assigned contact. In addition, passwords or passcodes have been offered and implemented on various devices. Typically, these passcodes are alphanumeric and involve typing the passcode on a keypad. As technology evolves and as the features and services offered on portable communication devices expand, the way shortcuts, passcodes, and other operations to these features and services are offered and implemented is changing.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to a computing device. In particular, various embodiments enable a user to provide an input to an application by covering or otherwise obscuring one or more cameras of a computing device in a particular order. For example, image information can be captured with multiple cameras as content is displayed by a computing device. Upon detecting an object, such as a portion of a hand or finger of a user, moving or passing over two or more of the cameras, a sequence in which the object moves over the cameras is compared to a set of group of sequences stored by, or otherwise accessible to, the computing device. In this example, each sequence corresponds to a function to be performed by the device, and in this case the motion can be identified as an input to launch an application, cause a function to be executed using the application, and the like, based upon the matching sequence. Accordingly, in response to the sequence matching one of the stored sequences, an input can be provided to the application corresponding to the sequence.

Various other functions and advantages are described and suggested below as may be provided in accordance with the various embodiments.

FIGS. 1A-1D show an example operation being performed on computing device 102 that includes multiple cameras (104, 106, 108, 110) in accordance with various embodiments. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. In this example, computing device 102 includes four cameras (104, 106, 108, 110), or other gesture sensors, configured to capture image information including a view of a portion of the user's hand, such as their finger, which can be analyzed by an application executing on the computing device 102 to determine a relative location of the finger to the computing device 102. The image information can be still image or video information captured using ambient or infrared light, among other such options. Further, fewer or additional cameras (i.e., two, three, etc.) of the same or different types can be used as well within the scope of the various embodiments. In some examples, the application can determine the position of the finger, and can track the position of the finger over time as the finger is detected above a respective camera by analyzing the captured image information. In other examples, the application can detect a change in some aspect of the images, such as an above threshold change in pixel intensities, blur, focus, color, or any other quality that would suggest movement within the image information.

Figure 1A:
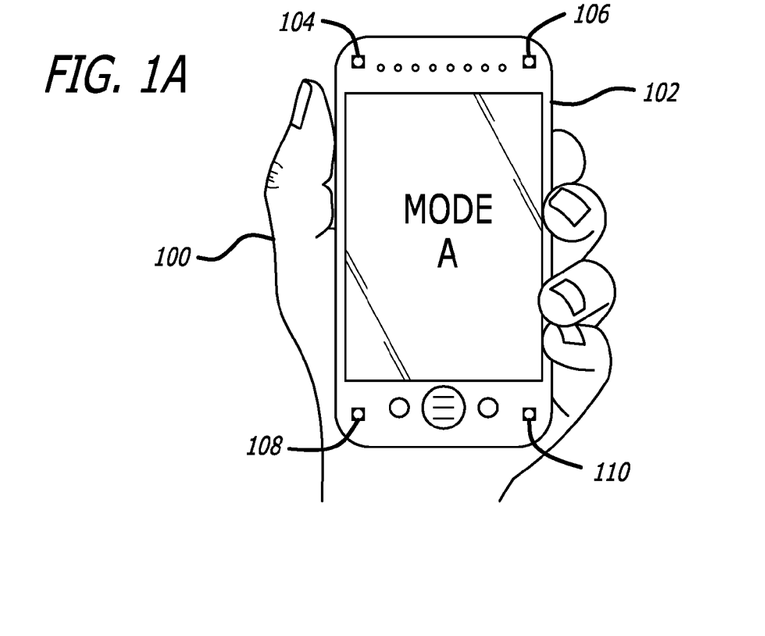
FIGS. 1A-1D show an example operation being performed within view of multiple cameras of a computing device in accordance with at least one embodiment.

FIG. 1A shows user 100 holding computing device 102 which is in a first "Mode A." In this example, Mode A may refer to an operational mode of computing device 102, such as a sleep mode, a default operational mode, a silent mode, and the like, which can be associated with particular functionality or operational characteristics. Additionally, Mode A may also refer to displayed content, such as an application page, home screen, and the like. Further, it should be understood that Mode A may also include a combination of both an operational mode and content.

In this example, user 100 can change the mode of computing device 102 (i.e., launch/open an application, change what is displayed thereon, or change the operational mode thereof) by covering, moving their hand over, or at least partially obscuring two or more of cameras (104, 106, 108, 110) in a particular order with their hand or finger. In one example, an application executing on computing device 102 (or at least in communication with the computing device) can analyze image information from cameras (104, 106, 108, 110) to locate one or more features of the hand, such as the finger or a fingertip position, or to detect a change in some aspect of the images, such as an above threshold change in pixel intensities, focus, color, and the like, using a feature recognition or an image analysis algorithm to determine movement of the hand, finger, stylus, or the like between image frames from two or more of cameras (104, 106, 108, 110).

Figure 1B:
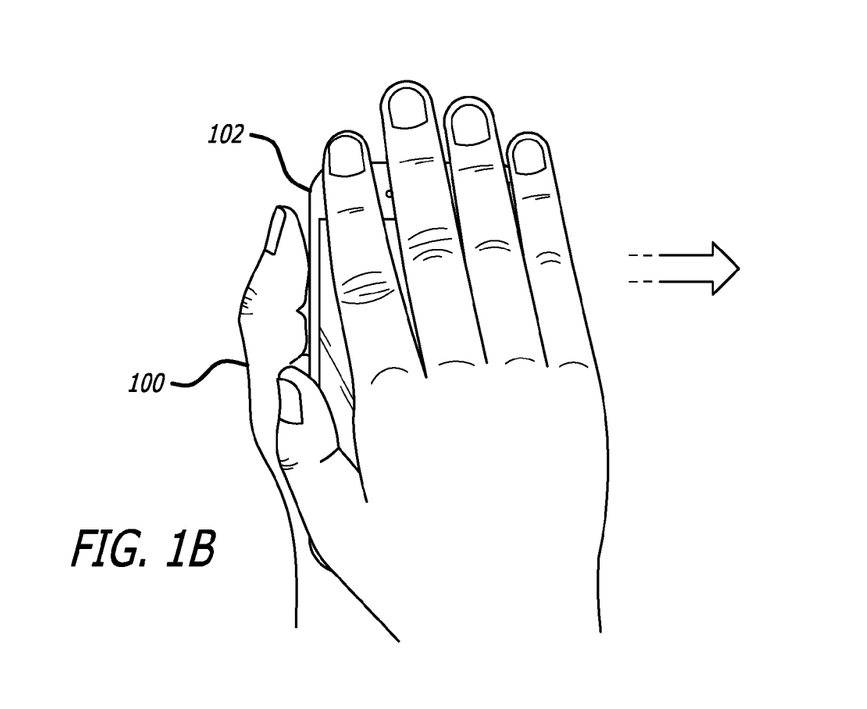

Accordingly, FIG. 1B shows user 100 moving their hand over computing device 102 from left to right. In this example, each of cameras (104, 106, 108, 110) are eventually covered, however, camera 104 and camera 108 will detect a change in some aspect of the images indicative of movement, such as a change in pixel intensities, a change or break in focus, a change in color, a change in blurriness, and the like, as the hand moves over camera 104 and camera 108 at substantially the same time before camera 106 and camera 110 detect substantially the same image characteristic change associated with the hand moving over their respective fields of view. Depending on frame rate capture of respective cameras, camera 104 and camera 108 could be covered or obscured by the hand of user 100 a moment before camera 106 and camera 110, such as if the hand were moving relatively quickly over computing device 102. Alternatively, there could be some overlap in time when camera 104 and camera 108 and camera 106 and camera 110 are covered, such as if the hand were moving relatively slow over computing device 102.

Figure 1C:
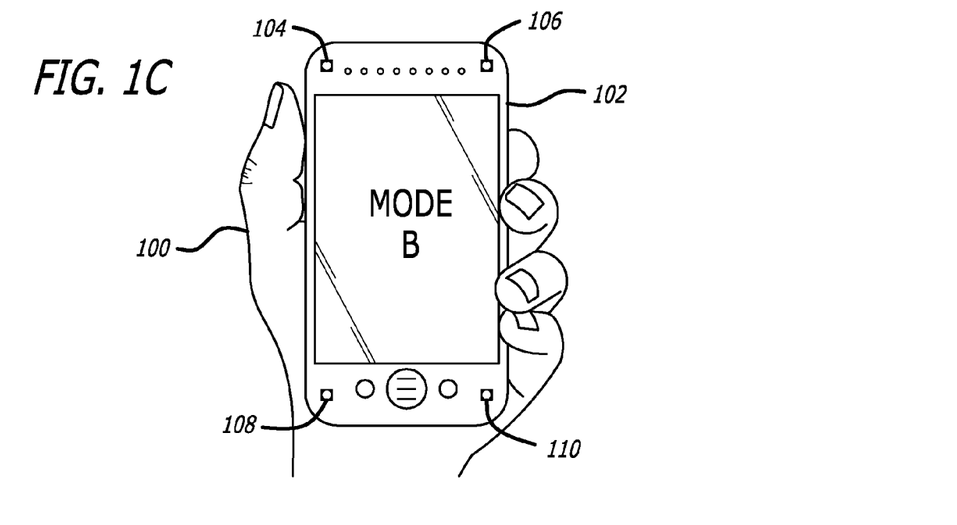
Figure 1D:
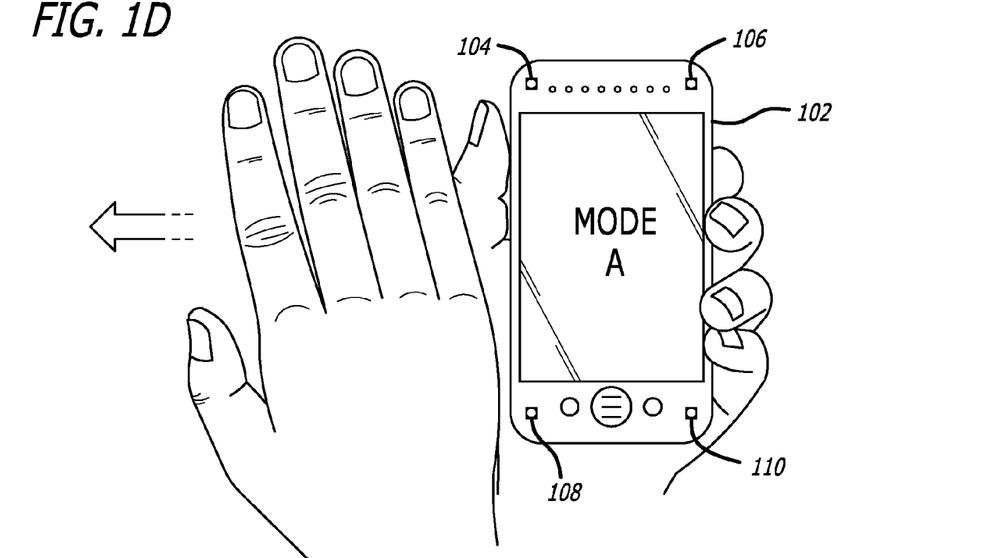

FIG. 1C shows computing device 102 which has changed from Mode A to a second mode, "Mode B," in response to user 100 moving their hand over each of cameras (104, 106, 108, 110). For example, Mode A could be a home screen and Mode B could be a favorite application, such as a game, email application, messaging application, and the like. Further, Mode A could be a default operating mode of computing device 102 and Mode B could put computing device 102 in a sleep or lock screen mode. In this example, user 100 could assign various camera covering or obscuring sequence combinations to launch/open applications or change what is displayed by computing device 102. FIG. 1D shows user 100 moving their hand over computing device 102 in reverse, from right to left, to subsequently change the mode computing device 102 from Mode B back to Mode A. Accordingly, computing device 102, in this example, now shows, on the display element, that computing device 102 is back in Mode B. In this example, detecting the reverse sequence could undo what the forward sequence does or user 100 could have assigned the motion or combination associated with moving their hand over computing device 102 from left to right to Mode A, such as a return to home screen command. Further, obscuring or covering a respective camera, as used herein, can refer to holding or hovering a finger or hand above a respective camera or actually touching the surface of computing device 102 to cover a respective camera.

In one embodiment, multiple cameras (104, 106, 108, 110) of computing device 102 can utilize ambient light surrounding the device or user, or can rely upon light emitted from a display element or other component of the electronic device. In other embodiments, at least one of multiple cameras (104, 106, 108, 110) may capture infrared (IR) or other radiation emitted from a component (e.g., an emitter such as an IR light emitting diode (LED) or laser diode) of the computing device 102, and reflected by user 100. In some embodiments, both an ambient light camera and one or more infrared detectors can be used to determine aspects of relative position and/or movement of the hand or finger.

Figure 2:
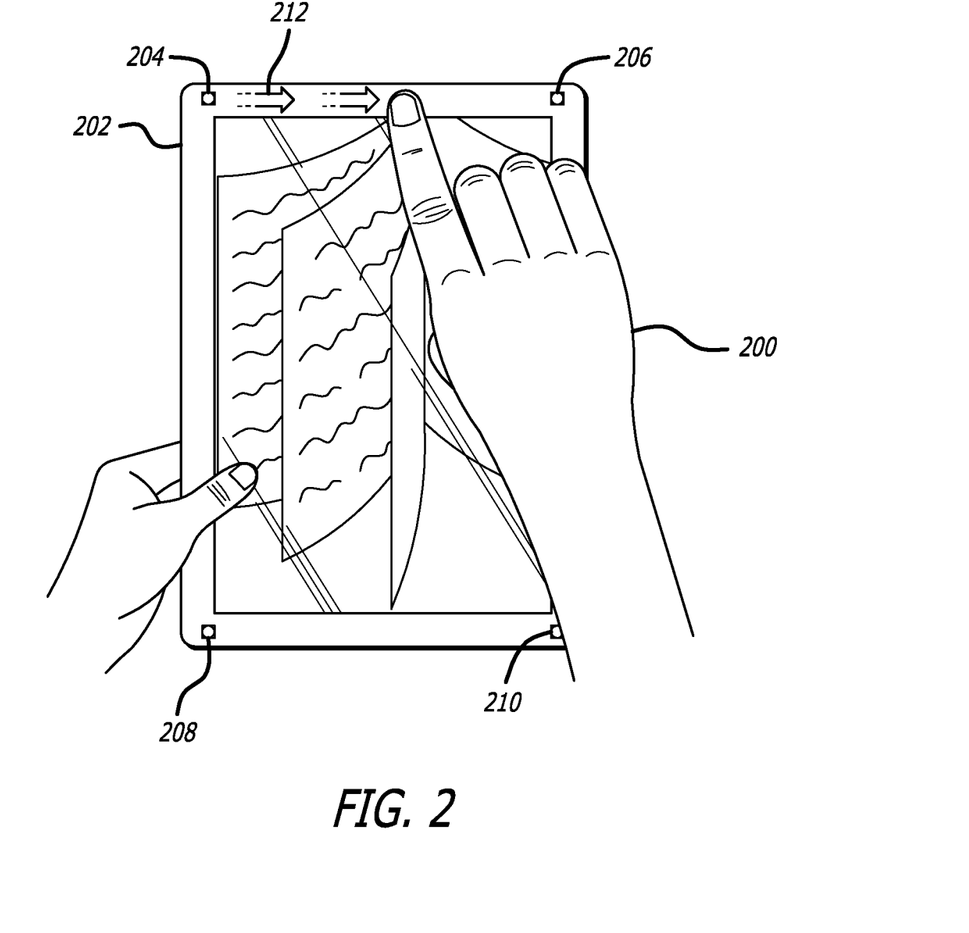
FIG. 2 shows another example operation being performed within view of multiple cameras of a computing device in accordance with at least one embodiment.

FIG. 2 shows another example operation being performed on computing device 202 that includes multiple cameras (204, 206, 208, 210) in accordance with various embodiments. In this example, user 200 can provide an input to an electronic book application or an electronic reader to turn a page of an electronic book by covering the cameras in a particular order that substantially simulates the motion a user's hand would make when turning a page of a real book. Accordingly, by moving their hand or finger from left to right within view of camera 204 and camera 206, computing device 202 animates, in this example, a page turn to the next page. In this example, an input combination or order includes momentarily covering or obscuring camera 204 then camera 206 as shown using directional arrow 212. Other in-application commands using various camera obscuring combinations or orders can be utilized and provided as well within the scope of the various embodiments.

Further, in at least one embodiment, user 200, viewing content on a first page of an electronic book, could peek at or preview content on a second page by covering camera 204, in this example. Accordingly, computing device 202, upon detecting camera 204 being covered, could animate or simulate what appears as if a page of a real or actual book is in the middle of being turned. Upon uncovering camera 204, the electronic book could return back to displaying the first page if camera 206 is not covered within a predetermined or threshold period of time. If, however, camera 206 is covered within the predetermined period of time, an animation of the first page being turned to the second page can be displayed on computing device 202.

Figure 3A:
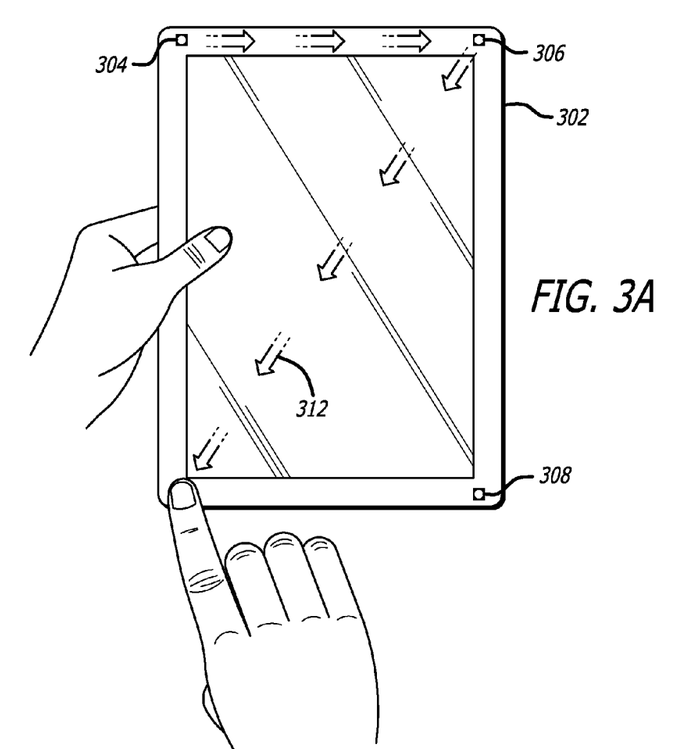
FIGS. 3A-3B show another example operation being performed within view of multiple cameras of a computing device in accordance with at least one embodiment.
Figure 3B:
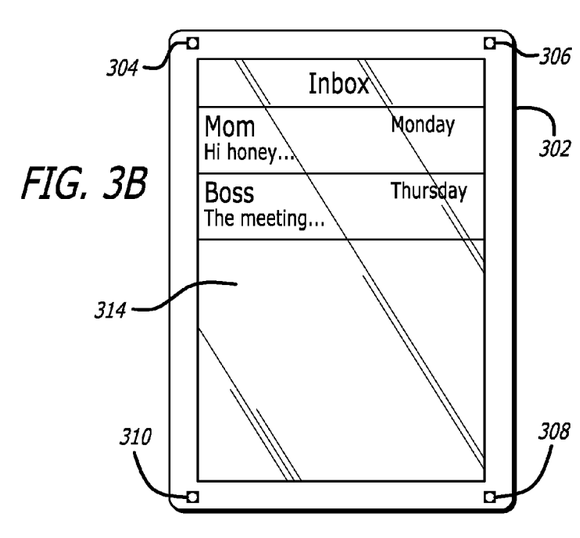

FIGS. 3A-3B show an example operation being performed on computing device 302 that also includes multiple cameras (304, 306, 308, 310) in accordance with various embodiments. In this example, user 300, instead of having to open and go through various folders on their home screen to find an application, could assign a camera obscuring combination or order to launch the application as a shortcut. Accordingly, FIG. 3A shows user performing a camera obscuring combination that includes swiping or passing their hand or finger first over camera 304, then over camera 306, and finally over camera 310, as shown by the directional arrows. Upon performing this combination, computing device 302 provides an input to an application associated with this particular order or combination. FIG. 3B shows application 314, which is an email application, launched in response to the computing device detecting and identifying a sequence shown in FIG. 3A. As mentioned above, user 300 could assign various camera covering or obscuring combinations to launch/open applications on computing device 302. Accordingly, user 300 could have assigned this particular combination, shown in FIG. 3A, to open the email application, a different combination to open their calendar application, another combination to open their messaging application, and so on.

Figures 4A, 4B, 4C:
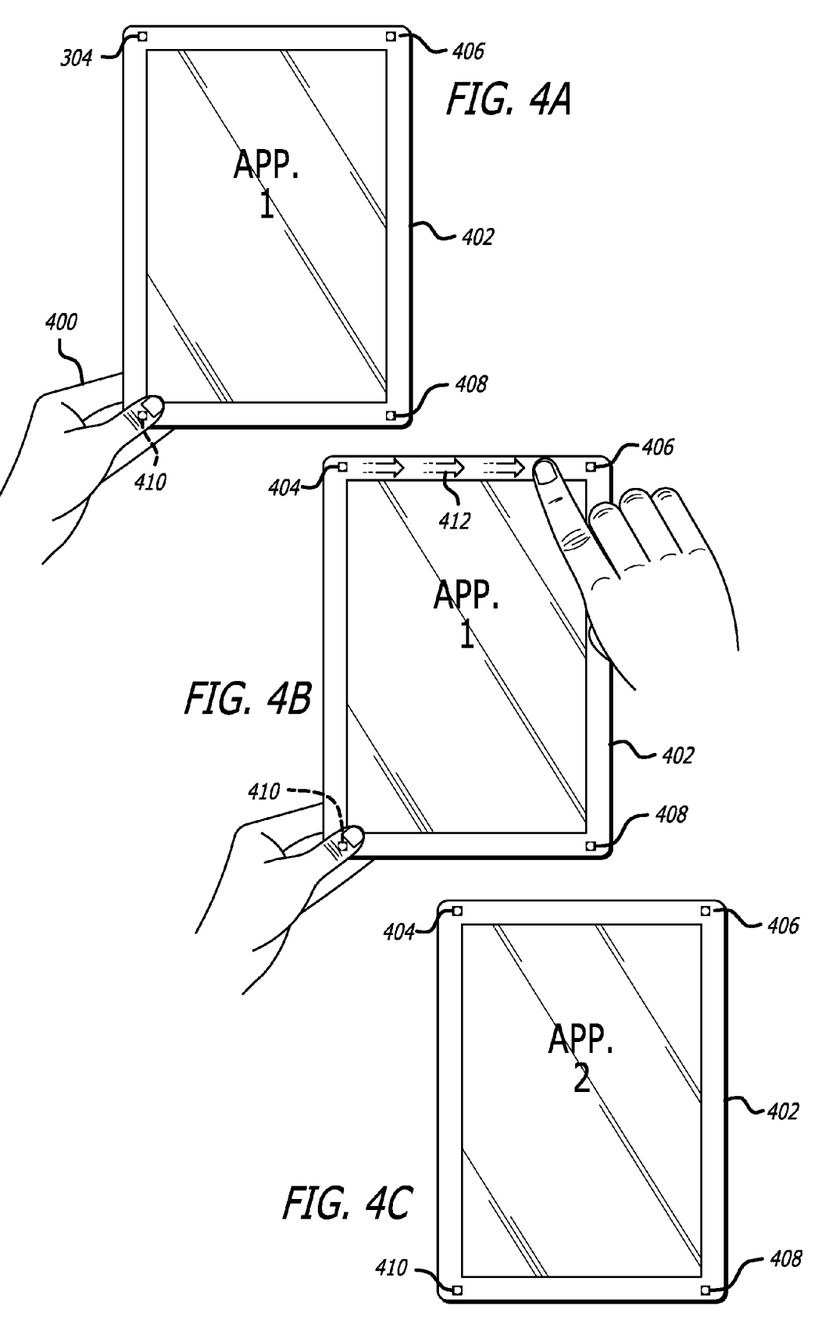
FIGS. 4A-4C show another example operation being performed within view of multiple cameras of a computing device in accordance with at least one embodiment.

FIGS. 4A-4C show an example operation being performed on computing device 402 that also includes multiple cameras (404, 406, 408, 410) in accordance with various embodiments. FIG. 4A shows computing device 402 displaying a first application, "App. 1," and being held such that camera 410 (shown in phantom) is covered by the thumb of user 400. In at least one embodiment, completely covering one camera while performing a camera obscuring combination on other cameras may also be used to provide an input. Accordingly, as shown in FIG. 4B, user 400 is covering camera 410 with their thumb as they perform a camera obscuring or covering combination that includes swiping or passing their hand or finger over, first, camera 404 and then camera 406. In response to the detecting camera 410 being covered while camera 404 detects, for example, a change in pixel intensity, a change in focus, or the like, subsequently followed by camera 406 detecting substantially the same image characteristic change within a predetermined time, an input is provided which causes a second application, "App. 2," to be opened or launched. Accordingly, as the finger of user 400 reaches and obscures camera 406, App. 2 is launched and displayed on computing device 402, as shown in FIG. 4C. In this example, user 400 could assign this camera obscuring combination as a passcode to unlock computing device 402 from a lock screen mode, to lock or unlock certain folders, content, or functionality to enable a young child to play with computing device 402 without being able to access sensitive content, or to launch an application, such as an email application, a favorite game, and the like.

Figure 5:
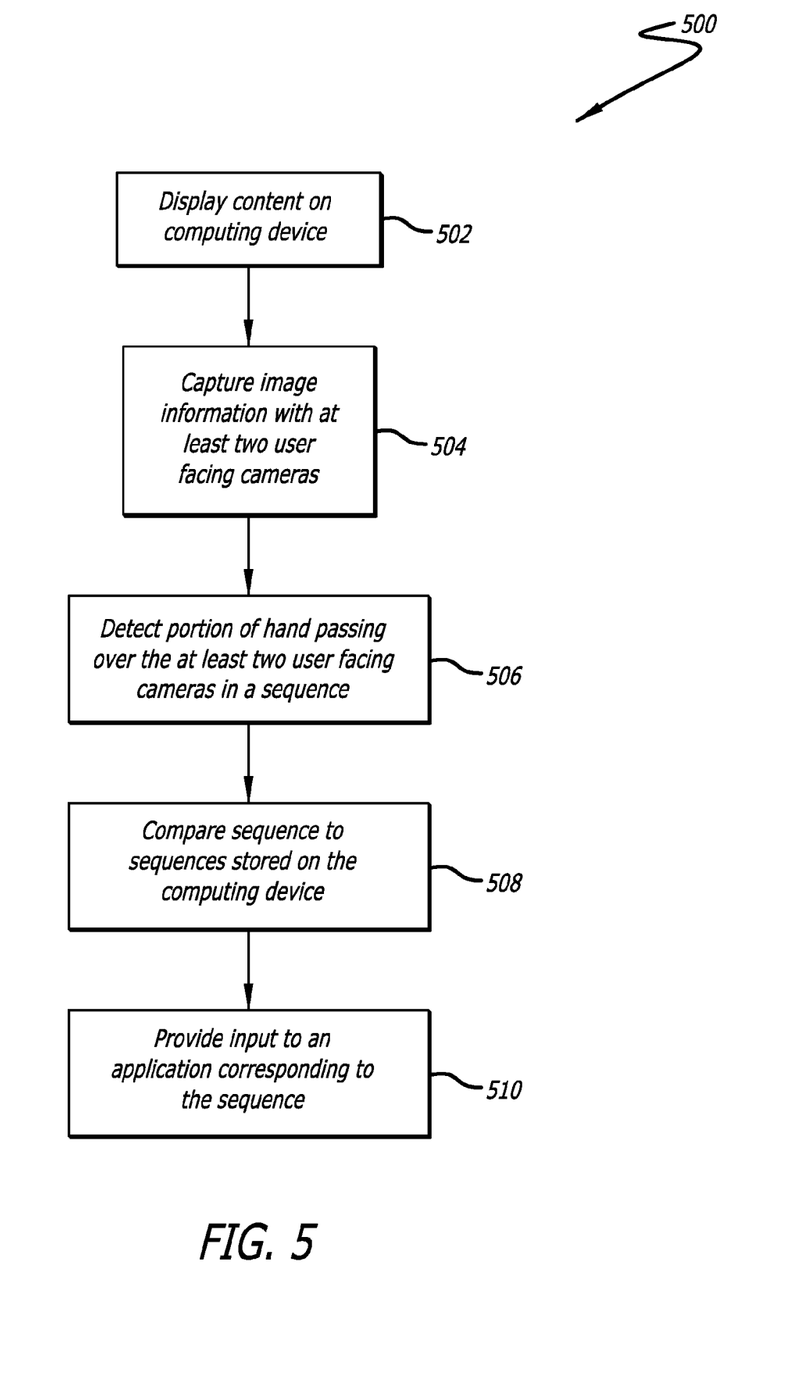
FIG. 5 shows an example process for providing input to a computing device that can be used in accordance with at least one embodiment.

FIG. 5 illustrates an example process 500 for providing input to a computing device using a camera obscuring or covering combination that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, content, such as an application, is displayed on a computing device 502. In one example, image information is captured using two or more cameras that face a user (i.e., the cameras are on the same face or side of the computing device as the display screen) 504. In one example, a portion of the image information, such as a set of image frames, are analyzed to detect an object, hand, or a portion of a hand, such as a finger, of a user passing over a field of view of at least two of the cameras. Accordingly, in this example, a portion of the hand is detected passing over the cameras in a particular sequence by the computing device 506. Using one or more matching algorithms, the sequence is compared against at least a portion of a set of sequences stored by the computing device (or by a system in communication therewith) until a stored sequence matches with a minimum level of certainty or confidence, etc. In response, the sequence is compared to a set of sequences stored by the computing device in a library or other such data repository, which upon detection, each cause an input to be provided to an application corresponding to the detected sequence 508. Accordingly, an input is provided to an application corresponding to the detected sequence 510 when the detected sequence matches one of the set of sequences stored by the computing device to within an allowable deviation. Other in application commands using various combinations of camera obscuring sequences can be utilized and provided as well within the scope of the various embodiments.

In at least one embodiment, a computing device may not necessarily require two or more cameras to provide an input. For example, a user could provide input to a single camera by moving their hand over the camera in a first direction and then move their hand over the camera in a second direction. Further, the user could cover the single camera in a pattern similar to, for example, Morse Code to provide input. In this example, each pattern would provide a different input to an application on the computing device.

A capacitive touch display screen can be used in conjunction with a camera obscuring or covering sequence to provide input for opening or launching an application or for switching operational modes of a computing device. In this example, a user could cover a combination of separate cameras and provide, for example, a tap or swipe on the touch display before, after, or in between covering the cameras. Further, different distances from each camera (or from the computing device) can, in various examples, provide different inputs. For example, a first input could be provided if pixels of a camera go black, as if the user is touching the surface of the display screen and substantially no light (or at least below a threshold level of light) is able to reach the camera. Accordingly, a second input could be provided when a camera obscuring sequence is made with the user's hand or finger a distance from the computing device, such as a few centimeters (i.e., 3-6 cm). In this example, light will still be able to reach the camera, however, the camera will register an image characteristic change, such as a break in focus, a drop in pixel intensity, a change in an amount of light, a change in color variation, a change in image noise level, and the like.

Input can be provided to a computing device by recognizing or monitoring the position of the user's fingertip or hand above a respective camera. In some embodiments, the relative location can be determined in two dimensions from the position of the fingertip in the image and the distance determined by the relative size of the fingertip in the image. In other embodiments, a distance detector or other such sensor can be used to provide the distance information. Accordingly, since there are multiple cameras, stereoscopic imaging (or another such approach) can be utilized to determine a relative position of the user's fingertip or hand with respect to the device in three dimensions. The cameras can include full color cameras, infrared cameras, grayscale cameras, and the like. In some embodiments, methods such as ultrasonic detection, feature size analysis, luminance analysis through active illumination, or other such distance measurement approaches can be used to assist with position determination as well.

Accordingly, one or more image analysis algorithms can be used to analyze the image information to perform pattern recognition, shape recognition, or another such process to identify the user's fingertip or hand. Approaches to identifying the user's fingertip or hand in an image, such may include feature detection, feature extraction, feature recognition, stereo vision sensing, character recognition, attribute estimation, or radial basis function (RBF) analysis approaches, are well known in the art and will not be discussed herein in detail. Upon identifying the user's fingertip or hand is determined. In various embodiments, software can use the location of the user's fingertip or hand with information about the cameras to determine a relative direction to the fingertip. Further, there can be offsets due to the physical locations in three dimensions of the features of interest. By looking for the intersection of the direction vectors to determine the position of the finger or hand in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

When performing a sequence in view of multiple cameras to provide input to a device, however, the device in at least some embodiments can require some sort of indication that the sequence is intended to be interpreted as an input. Various triggers or actions can be used to indicate to the device when to start and stop tracking and/or analyzing a sequence for input purposes. For example, a user can tap or squeeze on a button or region of the device with one hand to indicate that the device should track input of the user's other hand. A user also can speak a verbal command to start and/or stop the tracking. Other actions are possible as well, such as tilting or changing an orientation of the device, making a facial gesture, activating a light on an object to be tracked, etc.

Figure 6A:
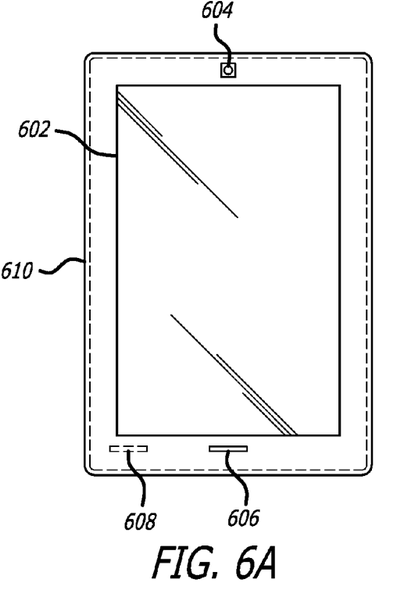
FIGS. 6A and 6B show an example computing device that can be used to implement aspects of various embodiments.
Figure 6B:
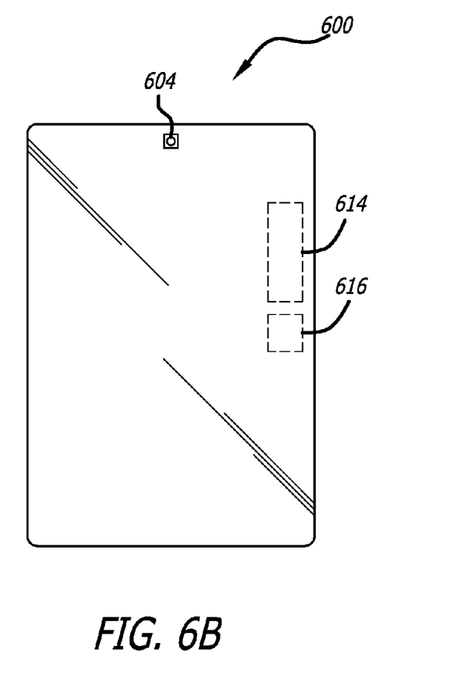

FIGS. 6A and 6B illustrate front and back views, respectively, of an example electronic computing device 600 that can be used in accordance with various embodiments.

Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
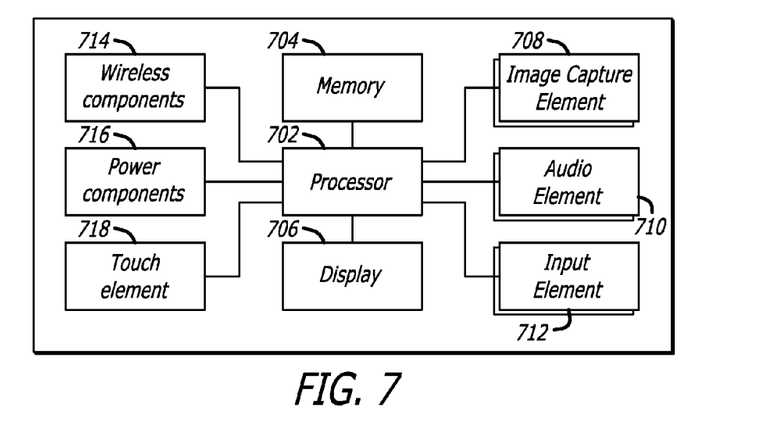
FIG. 7 shows example components that can be used with a device such as that illustrated in FIGS. 6A and 6B.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/ disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
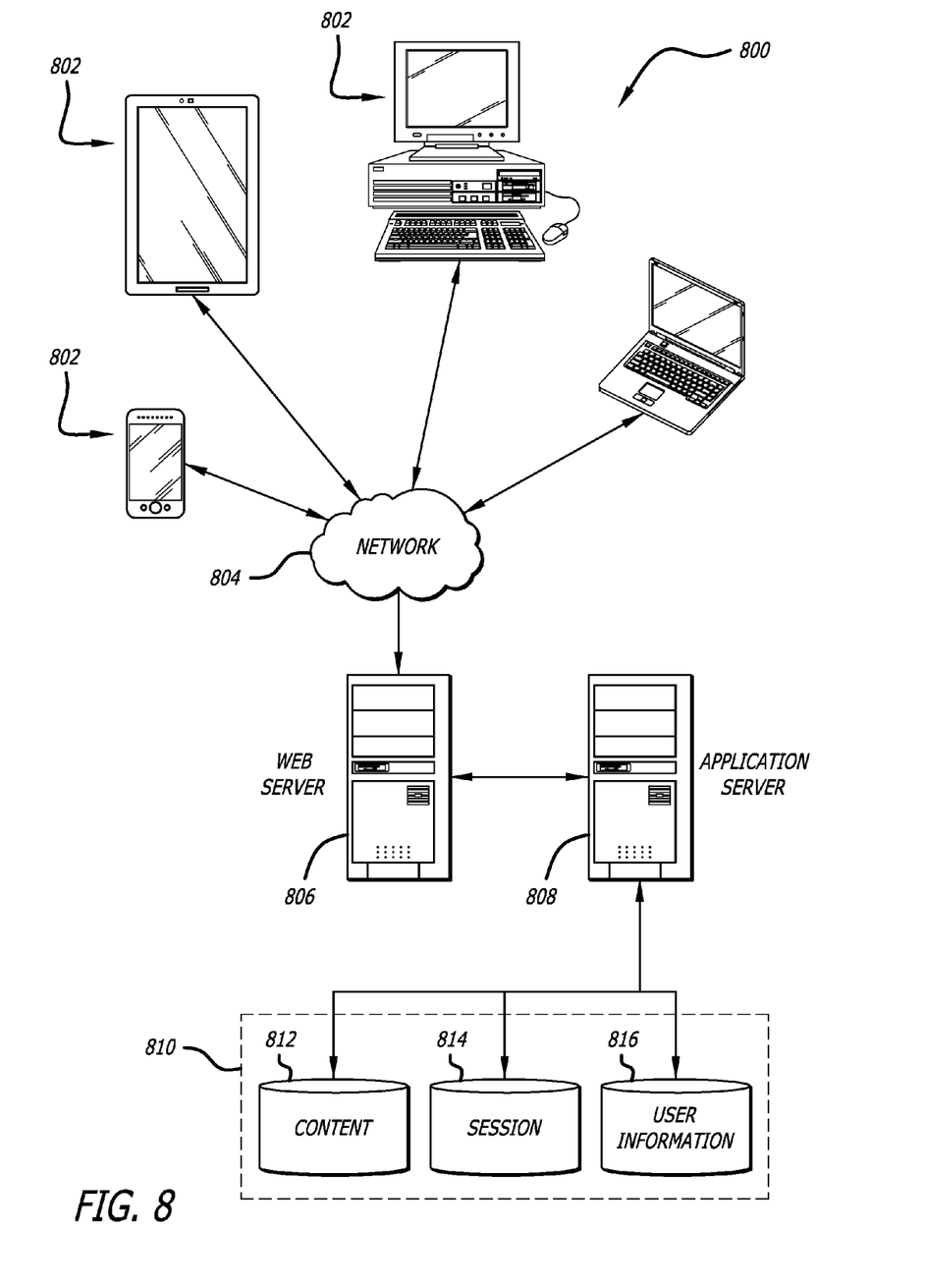
FIG. 8 shows an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a hand causes a first amount of light that reaches a first camera to fall below a first threshold level of light;

determining the hand causes a second amount of light that reaches a second camera to fall below a second threshold level of light;

determining an order in which the hand causes the first amount of light to fall below the first threshold and the second amount of light to fall below the second threshold;

comparing the order to a stored sequence representing one or more movements, the stored sequence corresponding to an input to be provided to an application on the computing device;

determining that the stored sequence matches the order to within an allowable deviation; and providing the input to the application corresponding to the stored sequence.

2. The computer-implemented method of claim 1, wherein the input is at least one of a command to turn a page of an electronic book, unlock the computing device from a lock screen, display content associated with the application, cause the application to be opened, or cause a function to be performed.

3. The computer-implemented method of claim 1, wherein the hand causing the first and second amount of lights to fall below the first and second thresholds corresponds to a change in at least one of pixel intensity, blur, color, or focus.

4. The computer-implemented method of claim 1, further comprising analyzing a first image and a second image by an image analysis algorithm to detect the hand.

5. The computer-implemented method of claim 1, wherein a matching algorithm compares the order to the stored sequence.

6. The computer implemented method of claim 1, wherein the first threshold corresponds to the hand being about 6 cm or less from the first camera, and the second threshold corresponds to the hand being about 6 cm or less from the second camera.

7. A computer-implemented method, comprising:

detecting, by a first camera and a second camera of a computing device, movement of an object obscuring the first camera and the second camera;

determining that the movement caused a first amount of light that reaches the first camera to fall below a first threshold level of light;

determining that the movement caused a second amount of light that reaches the second camera to fall below a second threshold level of light;

determining a detected sequence in which the object obscures the first camera and obscures the second camera, the detected sequence representing one or more movements;

comparing the detected sequence to a stored sequence representing one or more movements;

determining, upon comparing the detected sequence to the stored sequence, that the stored sequence matches the detected sequence to within an allowable deviation; and providing an input to an application corresponding to the stored sequence in response to the detected sequence matching the stored sequence to within the allowable deviation.

8. The computer-implemented method of claim 7, further comprising a set of stored sequences, wherein each of the stored sequences corresponds to a different input to be provided to at least one of the application or one of a plurality of applications on the computing device.

9. The computer-implemented method of claim 7, further comprising:

receiving, from a user of the computing device, a request to assign the stored sequence to the application.

10. The computer-implemented method of claim 7, wherein detecting movement of the object further involves detecting a change in at least one of a set of images captured by the first camera or the second camera, the change being one of pixel intensity, blur, color, or focus.

11. The computer-implemented method of claim 7, wherein the input is at least one of a command to turn a page of an electronic book, unlock the computing device from a lock screen, display content associated with the application, cause the application to be opened, or cause a function to be performed.

12. The computer-implemented method of claim 7, wherein a matching algorithm compares the detected sequence to the stored sequence.

13. The computer-implemented method of claim 7, further comprising a third camera of the computing device, wherein the detected sequence corresponds to an order in which the object obscures at least two of the first camera, the second camera, and the third camera.

14. The computer-implemented method of claim 7, wherein detecting the movement of the object includes:

capturing image information with each of the first camera and the second camera; and analyzing the image information using an image analysis algorithm to detect the object.

15. A computing device, comprising:

a processor;

a display screen; and memory including instructions that, when executed by the processor, cause the computing device to:

capture image information with a first camera and a second camera of the computing device;

detect, using the image information, movement of a hand obscuring the first camera and the second camera;

determine, using the image information, that the hand causes a first amount of light that reaches the first camera to fall below a first threshold level of light;

determine, using the image information, that the hand causes a second amount of light that reaches the second camera to fall below a second threshold level of light;

determine a detected sequence in which the hand obscures the first camera and the hand obscures the second camera, the detected sequence representing one or more movements; and provide, in response to the detected sequence, an input to an application corresponding to the detected sequence.

16. The computing device of claim 15, further comprising a third camera, wherein the detected sequence corresponds to an order in which the hand obscures at least two of the first camera, the second camera, and the third camera.

17. The computing device of claim 15, wherein detecting movement of the hand further involves detecting a change in the image information, the change being one of pixel intensity, blur, color, or focus.

18. The computing device of claim 15, wherein the input is at least one of a command to turn a page of an electronic book, unlock the computing device from a lock screen, display content associated with the application, cause the application to be opened, or cause a function to be performed.

19. The computing device of claim 15, wherein the instructions, when executed by the processor, further enable the computing device to:
   compare the detected sequence to at least a portion of a set of sequences, each of the sequences corresponding to a different input to be provided to at least one of the application or one of a plurality of applications on the computing device.

20. The computing device of claim 19, wherein each of the sequences is associated with one of a plurality of applications or one of a plurality of functions that, when detected, respectively cause one of the plurality of applications to be opened or one of the plurality of functions to be executed.

* * * * *